United States Patent Office 3,178,377
Patented Apr. 13, 1965

3,178,377
EXPANDABLE THERMOPLASTIC POLYMERIC MATERIAL
Rudolf A. V. Raff, Monroe Heights, Pitcairn, Pa., assignor to Koppers Company, Inc., a corporation of Delaware
No Drawing. Filed Nov. 6, 1961, Ser. No. 150,174
14 Claims. (Cl. 260—2.5)

This invention relates to expandable polymeric materials and to polymeric foams made therefrom. In one specific aspect, it relates to the use of a new type of expanding or blowing agent in making foamed polymeric materials.

Polymeric foam, particularly polystyrene foam, because of its low density and evenly fused surfaces, has become widely accepted as a construction and insulation material. Polystyrene foam is easily made according to the well-known process described in D'Alelio, U.S. 2,983,692, by incorporating in the polymer 3 to 30 parts by weight of an aliphatic or cyclo-aliphatic hydrocarbon boiling in the range of 35 to 60° C., e.g., petroleum ether pentane or hexane, to form an expendable polymer. The expandable particles are converted to polymeric foam by treating them with hot water, infrared rays, steam or high frequency waves.

Although the process of D'Alelio can be used to make expandable polymers from a member of different polymeric materials, including polyethylene, polypropylene, alkyl substituted polystyrenes, polyacrylic esters and polymethacrylic esters, the process does not work well with polymers having a softening point above about 125° C. In order to form the polymeric foam, the expandable polymer must be heated to a temperature above that at which the blowing agent volatilizes and above the softening point of the polymer. At higher foaming temperatures, such as those required for the polymers having high softening points, the hydrocarbon blowing agent gives inadequate or irregular foaming. Moreover, the hydrocarbon is not effectively retained by such polymers and after a short storage period they are no longer foamable. Because of these problems, polymers having a relatively high softening point, such as polypropylene and polyethylene, are usually foamed with a solid azo compound, such as azo dicarbonamide, or 2,2'-azo-bis-isobutyronitrile, in the manner described by Stevens et al., Ind. Chemist 27, 391–4 (1951). The solid azo blowing agents work with only limited effectiveness and they are subject to the serious disadvantage of high cost.

The foam polymers of high softening point, such as polypropylene and polyethylene, are particularly desirable because of their excellent electrical insulating properties and solvent resistance. Although these materials can be used in their unfoamed state for electrical insulation purposes, the foamed polymer provides the additional advantages of low density and greater flexibility.

In recent years workers in the art have strived to produce a polymeric foam that is self-extinguishing or flame retardant. Success in the preparation of such a foam may well determine the future of structural materials in the building industry. As a prerequisite for the use of polymeric foam as an insulating material in building construction, certain specifications set up by the Fire Underwriters Laboratory with respect to flame-retardant properties of the foam must be met. Obviously, highly flammable foam would be unsuitable for construction purposes, since the use of such foam would exacerbate the ever-present fire hazards in building and homes. Polymeric foams are also used to a considerable extent for making decorative and functional objects for home use. From the standpoint of safety it is extremely desirable that such objects be flame-retardant.

Quite surprisingly, I have discovered an expanding agent which, in one embodiment, has the unique property of concomitantly expanding the polymeric material and rendering the material flame retardant. Although my novel expandable polymers are somewhat higher in cost than those containing an aliphatic hydrocarbon as the sole expanding agent, my expanding agents are considerably more effective in the preparation of the much desired polymeric foams made from the polymers of high softening points. My expanding agents are considerably cheaper than the solid azo compounds used for this purposes and, moreover, their use results in a more uniform polymeric foam.

It is therefore an object of the present invention to provide a novel expandable polymer and a novel method of making polymeric foam. It is a further object to provide flame-retardant polymeric material suitable for construction and insulation purposes.

In accordance with the invention an expandable polymeric material is prepared by incorporating, within a thermoplastic polymer of a vinyl or olefinically unsaturated hydrocabon monomer having from 2–9 carbon atoms, from 0.5–10% of a compound having the formula:

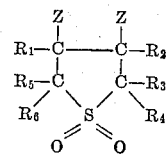

wherein $R_1$ and $R_2$ are hydrogen, methyl, chlorine or bromine; $R_3$, $R_4$, $R_5$ and $R_6$ are hydrogen or methyl; and the Z's taken independently are chlorine or bromine and collectively represent a bond between the carbon atoms to which they are attached. Polymeric foam is produced from the expandable polymers of the invention by heating the expandable material to a temperature above the decomposition temperature of the compound of the above formula and above the softening point of the polymer, but below the temperature at which there is measurable degradation of the polymer. The flame-retardant foams of the invention are made by choosing as an expanding agent a compound of the above formula wherein any or all of the $R_1$, $R_2$ and Z terms are chlorine or bromine. Of the useful halogens, bromine gives the best results.

The expanding agents of the present invention, the diene sulfones, are easily made by the reaction of sulfur dioxide and diolefins. For example, the preparation of butadiene sulfone from sulfur dioxide and butadiene is described by H. P. Staudinger in German Patent No. 506,839. This reaction is reversible, so that when the sulfones are heated they decompose into their original components. Particularly useful diene sulfones include, but are not limited to the following: 2,3-dimethyl butadiene-1,3-sulfone (140° C.), isoprene sulfone (125° C.), 4-methylpentadiene-1,3-sulfone (100° C.), butadiene-1,3-sulfone (125° C.) and piperylene sulfone (100° C.). The parenthetical temperatures represent the decomposition temperatures of the various sulfones.

The thermoplastic polymers useful in the invention are those made from vinyl or olefinically unsaturated hydrocarbons having from 2–9 carbon atoms. Particularly useful expandable polymers are made from polystyrene, high and low density polyethylene, polypropylene, polybutenes, polyvinylchloride, polyalpha-methyl styrene, polyacrylic esters and polymethacrylic esters; styrene copolymers, such as copolymers of styrene and alpha-methyl styrene, copolymers of styrene and vinyl toluene; copolymers of butadiene and other dienes with acrylonitrile or styrene; and ethylene copolymers, such as copolymers of ethylene and butene, ethylene and acrylates, ethylene and pentenes and the like.

In the preparation of a particular expandable polymer the choice of diene sulfone depends upon the softening point of the polymeric material. For example, in the preparation of polymeric foam from a polymer of low softening point, such as polystyrene (softening point ca. 100° C.), it is desirable to use a sulfone having a relatively low decomposition temperature, such as piperylene sulfone or 4-methylpentadiene-1,3-sulfone. For polymers of higher softening points, such as polypropylene and polyethylene, the sulfones which decompose at temperatures approximating the softening point of the polymer, e.g., butadiene-1,3-sulfone, isoprene sulfone or 2,3-dimethyl butadiene-1,3-sulfone, are best used.

The amount of diene sulfone incorporated within the polymeric material must be at least that sufficient to cause expansion of the material to from 5 to 30 times its original size upon heating. Generally, from about 0.5–10% by weight diene sulfone, based on the weight of the polymeric material, is sufficient for this purpose. No advantage is seen in using greater than about 10% diene sulfone because of the cost of the raw material. Below 0.5% by weight there is danger of obtaining insufficient foaming.

It is preferable to have present between about 1 and 5% by weight diene sulfone based on the weight of the polymeric material. The diene sulfone can be incorporated within the polymeric material in a number of ways. The polymer can be ground to a fine size, e.g., between 100 to 300 mesh, U.S. Sieves, and blended thoroughly with the appropriate amount of expanding agent. Hot milling at temperatures below the decomposition point of the expanding agent is effective in providing uniform distribution of the expanding agent throughout the polymeric mass. The expanding agent can be incorporated within the polymer by treating the polymer particles in a solution containing the required amount of expanding agent. Suitable solvents for this purpose include those which do not attack the particular polymer, such as methanol, water, pentane, hexane and the like. Although polystyrene dissolves in such solvents as benzene chloroform and carbon tetrachloride, these solvents can be used with polypropylene and polyethylene. The solvent can be removed from the polymer by evaporation and the expanding agent will be retained. The expanding agent can also be effectively incorporated by a suspension technique, such as that described in D'Alelio, supra, as will be explained in detail hereafter in connection with the flame-retardant polymers of the invention.

The expandable polymers are converted to the polymeric foam by the conventional methods of molding, extruding and thermal expansion. The expandable particles can be simply immersed in hot water or a higher boiling medium which does not attack the polymer, placed in a mold and treated with steam, or treated with infrared rays or high frequency energy according to the process described in U.S. 2,998,501 of Edwin A. Edberg et al. The expansion is accomplished by heating the expandable polymer to a temperature above the softening point of the polymer and above the decomposition temperature of the diene sulfone under the pressure conditions used. Ordinarily, expansion is accomplished at atmospheric pressure. Foaming temperatures at which there is noticeable degradation of the polymeric material should be avoided. An effective temperature range for foaming is between 100 and 250° C. The sulfur dioxide given off as a result of the decomposition of the expanding agent is substantially removed from the foam polymeric material during the foaming operation. Any residual sulfur dioxide is dissipated after a short storage period.

In one embodiment of the invention certain diene sulfones have the unique property of concomitantly effecting expansion and imparting self-extinguishing properties to the polymeric foam produced therewith. To prepare the self-extinguishing foams contemplated by the invention, the useful expanding agents are those of the above formula wherein any or all of the $R_1$, $R_2$ and Z terms are chlorine or bromine. These diene sulfones are prepared by reacting chloroprene or bromoprene with sulfur dioxide or by partially or totally halogenating a diene sulfone. As I have noted, the expanding agent decomposes when the expandable polymer is heated to form the foam. The decomposition product is in some way retained by the polymer and imparts thereto flame-retardant characteristics. The use of the flame retarding class of diene sulfones is particularly worthwhile in the preparation of expandable polymers from polyethylene and polypropylene. Known methods of rendering these high-melting polymers flame retardant involve the use of such substances an antimony oxide and halogenated hydrocarbons, which are incorporated within, and remain with, the final product. Such additives often tend to destroy the desirable insulation properties of the polymeric material. In contrast therewith, the expanding agents of the invention are themselves destroyed during expansion and, yet, are surprisingly effective in rendering the polymer flame-retardant.

In making the flame-retardant expandable polymers from the polymeric materials of low softening point, such as polystyrene, it is often effective to use the diene sulfone flame-retarding and expanding agents in combination with the aliphatic hydrocarbon blowing agent conventionally used with polystyrene. The presence of the hydrocarbon blowing agent is helpful in making polymers of low density and smaller cell size, while the expanding agents of the invention serve to assist in the expansion and, at the same time, render the final product flame retardant. This combination of expanding agents can be best incorporated within the polymeric foam by the method of D'Alelio described in U.S. Patent 2,983,692. By that method, a stable, aqueous suspension is formed containing the polymer particles, the aliphatic hydrocarbon and the diene sulfone. Intimate contact is maintained between the hydrocarbon and the polymer, thereby incorporating into the particles the required amount of diene sulfone and from 5 to 30% by weight of the hydrocarbon, based upon the weight of the particles. The suspensions are stabilized by an organic or inorganic stabilizing or suspension agent. Among the organic dispersants, polyvinyl alcohol and alkyl aryl sulfonates are quite suitable. The inorganic dispersants include zinc oxide, calcium carbonate, bentonite, talc, kaolin, calcium phosphate, aluminum oxide, barium sulfate, magnesium carbonate, and the like. Particularly effective are the difficulty soluble phosphates, described in U.S. 2,594,913 of J. M. Grim. Generally, impregnation of the polymeric particles is accomplished by maintaining the stabilized suspension at temperatures between 70 and 90° C. for from 2 to 12 hours. The resulting polymer beads are thereafter dewatered, washed if desired and dried.

My invention is further illustrated by the following examples:

*Example I*

Polystyrene beads, 100 parts, were admixed with butadiene sulfone, 3 parts, and blended by rotating the mixture in a closed container to achieve a uniform distribution of the expanding agent throughout the polymer. The resultant blend was extruded through a 1 inch NRM Extruder with a 6-inch heated barrel using an extrusion temperature of 250°–390° F. The resulting product had a density averaging from 9.5 to 13.2 lbs. per cu. ft. and a cell size of 10–50 mils in diameter. The freshly made foams had a noticeable odor, characteristic of sulfur dioxide and butadiene. After aging for about three weeks, these oders had dissipated.

Example II

The procedure of Example I was repeated using a blend of 100 parts polystyrene and 1.5 parts butadiene sulfone. The resulting foams had a density ranging between 15.9 to 19.7 lbs. per cu. ft. It is seen from this example that lower density foams are obtained if a greater amount of expanding agent is present in the polymeric mass. Foams having the desirable low density range between 2 to 5 lbs. per cu. ft. are made using 6–10% by weight expanding agent.

Example III

The procedure of Example I was repeated using a 9-melt index linear polyethylene (73% through 200 mesh), 100 parts, blended with 3 parts butadiene sulfone. The blend was extruded at 320–350° F. through the 1 inch NRM Extruder. The foamed product had a density ranging between 5.25–6.25 per cu. ft. with a cell size in the range of 30–100 mils. All cells were closed and there was no evidence of blistering.

The use of a larger extruder with a longer barrel would permit more intimate mixing of the expanding agent within the polymer and provide material having a smaller cell size.

Example IV

The procedure of Example III was repeated using 1.5 parts butadiene sulfone. The resulting product had a density of 9.1–10.1 per cu. ft., indicating (as in Example II) that lower density products are obtained when a higher percentage of expanding agent is used. Results similar to those obtained in the preceding examples are achieved by substituting isoprene sulfone, piperylene sulfone or 4-methylpentadiene-1,3-sulfone for the butadiene sulfone used therein. Similar foamed products are made using branched chain polyethylene or polypropylene as the thermoplastic material.

Example V

A saturated solution of 24 parts butadiene sulfone in water was cooled in ice. A solution of 35 parts of bromine and 100 cc. glacial acetic acid was added slowly with stirring. While flakes of dibromobutadiene sulfone immediately precipitated. These flakes were filtered, washed free of acid and used as an expanding agent in the following example.

Example VI

A polymerization reactor was charged with 0.17 g. hydroxyethyl cellulose disolved in 110 g. distilled water, 1 g. of tricalcium phosphate, 100 g. of styrene containing 0.22 g. dibenzoyl peroxide, 0.5 g. dicumyl peroxide, 0.55 g. ditertiary butyl perbenzoate and 2 g. of dibromobutadiene sulfone, and 13 ml. of a 1:1 (by volume) mixture of normal and iso-pentane. Polymerization was accomplished by rotating the polymerization vessel in a circulating oil bath heated to 90° C. for 8 hours and subsequently maintained at 115° C. for another 4 hours. After cooling the reaction mass was acidified, washed with water and dried on trays at room temperature for 12 hours. The resulting expandable polystyrene beads contained 2% by wieght dibromobutadiene sulfone and had a volatile content of 5.8% pentane blowing agent.

The beads thus prepared were expanded by heating in steam for three minutes to form a prepuff material having a density of 0.85 lb. per cu. ft. The prepuff beads were molded to form a well fused foamed product.

Flame retardance of the product was determined by a vertical modification of ASTM test method D–634–44 in which a sample bar 6″ x 1″ x ½″ was ignited and the flame removed. The foam sample had an average burning length of 1.3 inches. A burning length of 2 inches is considered satsifactory for self-extinguishing polystyrene. A sample of molded expandable polystyrene containing no dibromobutadient sulfone was burned completely in a similar test.

Similar results are obtained if chloroprene or bromoprene sulfone is substituted for the dibromobutadiene sulfone.

Example VII

Polypropylene, 200 g., is blended with 5 g. butadiene sulfone and extruded through a 1 inch NRM extruder with a 6 inch heated barrell using an extrusion temperature of 270–330° F. The samples foamed quite well to give products having a density ranging between 13.1 and 20.6 lbs. per cu. ft. The cell size of the foamed product was 30–110 mils at 270° F. and 50–150 mils at 330° F. It is thus apparent that the cell size of the foamed product decreased as the extrusion temperature was decreased.

Example VIII

The procedure of Example VII was substantially repeated with the exception that only 3 g. butadiene sulfone was blended with 200 g. of polypropylene. The expandable polymer was extruded at a temperature between 270–330° F. to obtain a foamed product having a density of 26 lbs. per cu. ft. It was observed that at this lower concentration of butadiene sulfone (1.5% in contrast with the 3% of Example VII), the extrusion temperature had less effect on the utimate cell size.

I claim:

1. Method of making expandable polymeric material comprising incorporating, within a solid thermoplastic polymer selected from the group consisting of polystyrene, polyethylene, and polypropylene, from 0.5–10% by weight of a compound having the formula

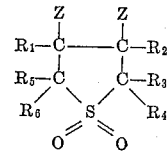

wherein $R_1$ and $R_2$ are members selected from the group consisting of hydrogen, methyl, chlorine and bromine; $R_3$, $R_4$, $R_5$ and $R_6$ are members selected from the group consisting of hydrogen and methyl, and Z, as an individual substituent, is a member selected from the group consisting of chlorine and bromine and taken collectively, the Z's represent a bond between the carbon atoms to which they are attached.

2. Method according to claim 1 wherein said polymer is polystyrene.

3. Method according to claim 1 wherein said polymer is polyethylene.

4. Method according to claim 1 wherein said polymer is polypropylene.

5. Method according to claim 1 wherein said compound is butadiene sulfone.

6. Method of making foamed polymeric material comprising incorporating, within a solid thermoplastic polymer selected from the group consisting of polystyrene, polyethylene, and polypropylene, from 0.5–10% by weight of a monomeric compound having the formula

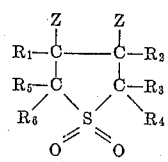

wherein $R_1$ and $R_2$ are members selected from the group consisting of hydrogen, methyl, chlorine and bromine; $R_3$, $R_4$, $R_5$ and $R_6$ are members selected from the group consisting of hydrogen and methyl, and Z, as an individual substituent, is a member selected from the group consisting of chlorine and bromine and, taken collectively, the Z's represent a bond between the carbon atoms to which they are attached, and heating said polymer to a temperature above its softening point and above the decomposition temperature of said diene sulfone, but below that at which degradation of the polymer occurs.

7. Method according to claim 6 wherein said polymer is polystyrene.

8. Method according to claim 6 wherein said polymer is polyethylene.

9. Method according to claim 6 wherein said compound is butadiene sulfone.

10. Method according to claim 6 wherein said compound is dibromobutadiene sulfone and the resulting foamed polymeric material is flame-retardant.

11. An expandable polymeric material comprising a solid thermoplastic polymer selected from the group consisting of polystyrene, polyethylene, and polypropylene having incorporated therewith from 0.5–10% of a monomeric compound having the formula

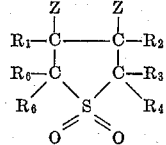

wherein $R_1$ and $R_2$ are members selected from the group consisting of hydrogen, methyl, chlorine and bromine; $R_3$, $R_4$, $R_5$ and $R_6$ are members selected from the group consisting of hydrogen and methyl, and Z, as an individual substituent, is a member selected from the group consisting of chlorine and bromine and, taken collectively, the Z's represent a bond between the carbon atoms to which they are attached.

12. Method according to claim 11 wherein said polymer is polystyrene.

13. Method according to claim 11 wherein said polymer is polyethylene.

14. Method according to claim 11 wherein said compound is butadiene sulfone.

References Cited by the Examiner
UNITED STATES PATENTS

| | | | |
|---|---|---|---|
| 2,645,631 | 7/53 | Couch et al. | 260—79.3 |
| 2,927,904 | 3/60 | Cooper | 260—2.5 |
| 2,945,828 | 7/60 | Henning | 260—2.5 |
| 2,983,692 | 5/61 | D'Alelio | 260—2.5 |
| 3,022,254 | 2/62 | Jones et al. | 260—2.5 |

MURRAY TILLMAN, *Primary Examiner.*

LEON J. BERCOVITZ, *Examiner.*